(12) United States Patent
Pelc et al.

(10) Patent No.: US 11,086,966 B2
(45) Date of Patent: Aug. 10, 2021

(54) APPARATUS FOR SOLVING ISING PROBLEMS

(71) Applicant: HEWLETT PACKARD ENTERPRISE DEVELOPMENT LP, Houston, TX (US)

(72) Inventors: Jason Pelc, Palo Alto, CA (US); Thomas Van Vaerenbergh, Palo Alto, CA (US); Raymond G Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 637 days.

(21) Appl. No.: 15/757,043

(22) PCT Filed: Sep. 8, 2015

(86) PCT No.: PCT/US2015/048952
§ 371 (c)(1),
(2) Date: Mar. 2, 2018

(87) PCT Pub. No.: WO2017/044077
PCT Pub. Date: Mar. 16, 2017

(65) Prior Publication Data
US 2018/0267937 A1    Sep. 20, 2018

(51) Int. Cl.
*G06F 17/16*     (2006.01)
*G06N 3/04*      (2006.01)
*G06N 3/067*     (2006.01)
*G06N 10/00*     (2019.01)
*G06N 5/00*      (2006.01)

(52) U.S. Cl.
CPC ........... *G06F 17/16* (2013.01); *G06N 3/0445* (2013.01); *G06N 3/0472* (2013.01);
(Continued)

(58) Field of Classification Search
CPC .... G06F 17/16; G06N 3/0445; G06N 3/0472; G06N 3/0675; G06N 5/003; G06N 10/00
See application file for complete search history.

(56) References Cited

U.S. PATENT DOCUMENTS

| 7,062,114 B2 | 6/2006 | Webjorn |
| 8,433,070 B2 | 4/2013 | Habif |

(Continued)

FOREIGN PATENT DOCUMENTS

| WO | WO-2014192153 | 12/2014 |
| WO | WO-2015006494 | 1/2015 |

OTHER PUBLICATIONS

Adam Byrnes, "Photonic chip based tunable and reconfigurable narrowband microwave photonic filter using stimulated Brillouin scattering," Optics express 20, No. 17 (2012): 18836-18845.
(Continued)

*Primary Examiner* — Bijan Mapar
(74) *Attorney, Agent, or Firm* — Sheppard Mullin Richter & Hampton LLP

(57) ABSTRACT

In example implementations, an apparatus includes a plurality of nodes, a pump coupled to the plurality of nodes and a connection network. In one example, each one of the plurality of nodes may store a value. The pump provides energy to the each one of the plurality of nodes. The connection network may include a two dimensional array of elements, wherein each group of the two dimensional array of elements is in communication with a respective one of the plurality of nodes, wherein the connection network may be tuned with parameters associated with encoding of an Ising problem. The connection network may process the value stored in each one of the plurality of nodes. The Ising problem may be solved by the value stored in each one of the plurality of nodes at a minimum energy level.

17 Claims, 4 Drawing Sheets

(52) U.S. Cl.
CPC ........... *G06N 3/0675* (2013.01); *G06N 5/003* (2013.01); *G06N 10/00* (2019.01)

(56) References Cited

U.S. PATENT DOCUMENTS

| | | | |
|---|---|---|---|
| 9,052,448 B2 | 6/2015 | Hafezi | |
| 9,633,715 B2 | 4/2017 | Yoshimura et al. | |
| 9,830,555 B2 | 11/2017 | Marandi | |
| 2012/0066172 A1 | 3/2012 | Jebara | |
| 2014/0046626 A1* | 2/2014 | Yamamoto | B82Y 10/00 702/151 |
| 2014/0187427 A1 | 7/2014 | MacReady | |
| 2014/0200689 A1* | 7/2014 | Utsunomiya | B82Y 10/00 700/90 |
| 2014/0270621 A1 | 9/2014 | Dutt | |
| 2016/0162798 A1* | 6/2016 | Marandi | G06N 10/00 708/191 |
| 2017/0272087 A1* | 9/2017 | Kanao | H03L 7/099 |
| 2017/0323195 A1* | 11/2017 | Crawford | G06N 3/08 |

OTHER PUBLICATIONS

Assaf Shacham, "Maximizing GFLOPS-per-Watt: High-Bandwidth, Low Power Photonic On-Chip Networks," in P=ac2 Conference, pp. 12-21, 2006.

Kristen L. Pudenz, "Quantum annealing correction for randomizing problems," American Physical Society, Apr. 2, 2015 (http://arxiv.org/abs/1408.4382), pp. 1-17.

Michele Petracca, "Photonic Networks-on-Chip: Opportunities and Challenges," Circuits and Systems, 2008. ISCAS 2008. IEEE International Symposium on. IEEE, 2008.

PCT/ISA/Kr, International Search Report and Written Opinion, dated Jun. 8, 2016, PCT/US2015/048952, 9 pages.

Zhe Wang, "A coherent ising machine based on degenerate optical parametric oscillators," Physical Review A 88.6 (2013): 063853.

D. A. B. Miller, "Self-configuring universal linear optical component," Photonics Research, vol. 1 (1), pp. 1-15.

Hamerly et al., "Optical Devices based on Limit Cycles and Amplification in Semiconductor Optical Cavities," Jul. 30, 2015, pp. 1-17.

Haribara et al., "A coherent Ising machine for maximum cut problems : Performance evaluation against semidefinite programming relaxation and simulated annealing," Feb. 29, 2016, pp. 1-10.

Harris et al., "Bosonic transport simulations in a large-scale programmable nanophotonic processor," Jul. 20, 2015, pp. 1-8.

Marandi et al., "Network of time-multiplexed optical parametric oscillators as a coherent Ising machine," Nature Photonics, Oct. 26, 2014, 17 pages.

Yamaoka et al., "24.3 20k-spin !sing chip for combinational optimization problem with CMOS annealing," in ISSCC, Feb. 22-26, 2015, pp. 432-434.

* cited by examiner

APPARATUS FOR SOLVING ISING PROBLEMS

STATEMENT OF GOVERNMENT INTEREST

This invention was made with government support under Contract No. N66001-12-2-4007, awarded by Defense Advanced Research Projects Agency. The government has certain rights in this invention.

BACKGROUND

The Ising model has roots in solid-state physics as a simple model of ferromagnets. The Ising model maps a broad class of combinatorial optimization problems for which no efficient, accurate classical algorithm exists. The Ising model may be described by a Hamiltonian function as follows:

$$H = -\sum_{i<j} J_{ij} \overline{\sigma_i} \cdot \overline{\sigma_j} \; (1 \leq i, j \leq N),$$

where $J_{ij}$ are the elements of a coupling matrix between spins $\sigma_i$ and $\sigma_j$.

DETAILED DESCRIPTION

The present disclosure broadly discloses an integrated photonic coherent Ising machine to solve Ising problems. As discussed above, the Ising model has roots in solid-state physics as a simple model of ferromagnets. The Ising model maps a broad class of combinatorial optimization problems for which no efficient, accurate classical algorithm exists. The Ising model may be described by a Hamiltonian function as follows:

$$H = -\sum_{i<j} J_{ij} \overline{\sigma_i} \cdot \overline{\sigma_j} \; (1 \leq i, j \leq N),$$

where $J_{ij}$ are the elements of a coupling matrix between spins $\sigma_i$ and $\sigma_j$ and N is a number of nodes in the nodes in the system.

Examples of the present disclosure provide a combination of nodes and a connection network to solving a particular Ising problem. In one example, the combination of nodes and the connection network may form an optical computer that is adiabatic. In other words, the combination of the nodes and the connection network may non-deterministically solve an Ising problem when the values stored in the nodes reach a steady state to minimize the energy of the nodes and the connection network. Values stored in the nodes at the minimum energy level may be associated with values that solve a particular Ising problem.

For example, the connection network may be built in accordance with the Hamiltonian function described above. Various input parameters associated with a specific Ising problem may be inputted to the connection network. Each one of the nodes may store an initial value. A feedback loop between the nodes and the connection network may pass the stored value from the nodes to the connection network. The values may be processed by the connection network and the processed values may be fed back to the nodes and stored in the nodes. This process may be repeated until a steady state is reached at a minimum energy level.

Figure 1:
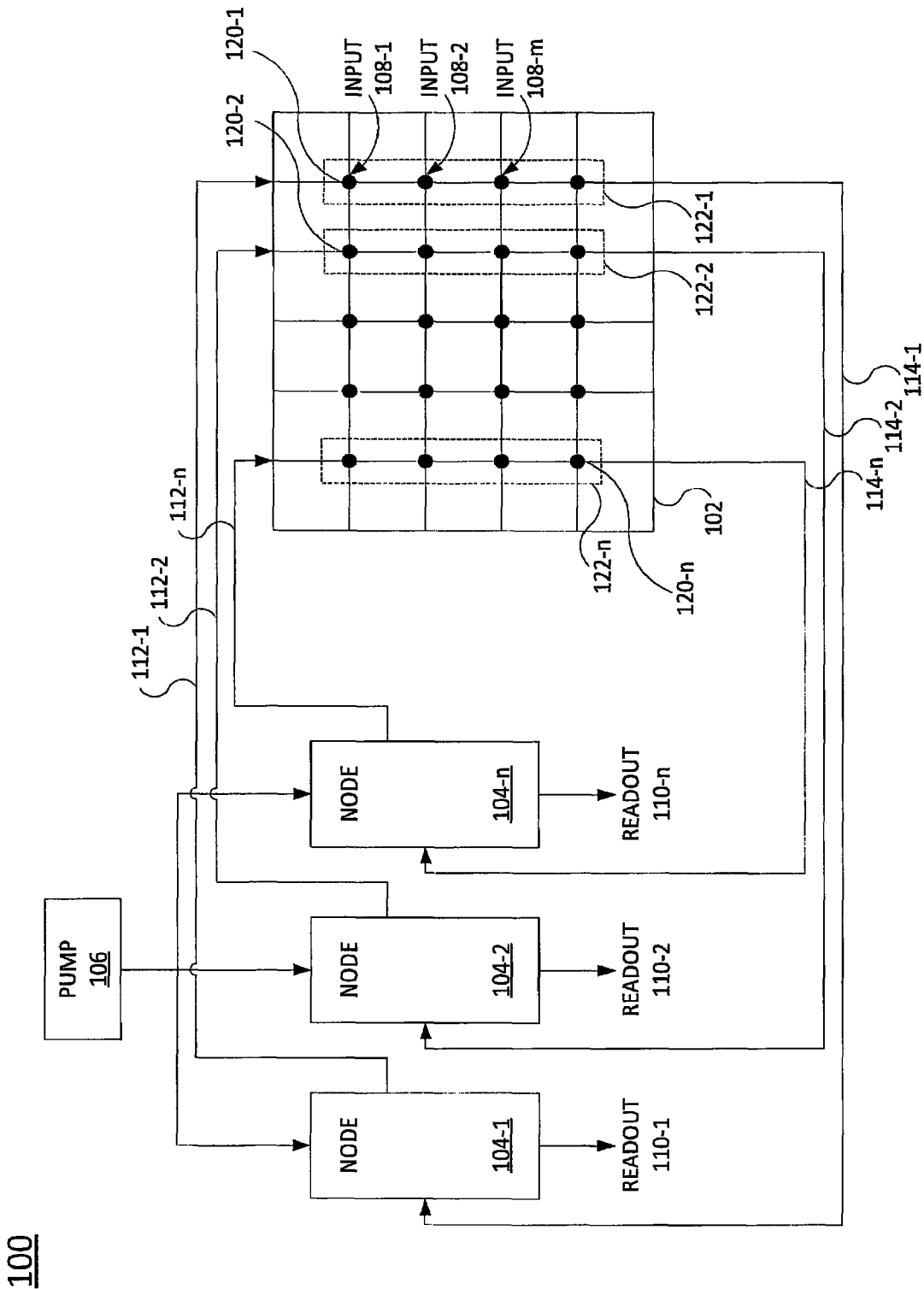
FIG. 1 is a block diagram of an example apparatus of the present disclosure.

FIG. 1 illustrates an example apparatus 100 of the present disclosure. The apparatus 100 may include a connection network 102, a plurality of nodes 104-1 to 104-*n* (herein also referred to collectively as nodes 104 or individually as a node 104) and a pump 106. In one example, the pump 106 may provide a coherent light. In other words, the pump 106 may be a coherent pump. It should be noted that although a single pump 106 is illustrated in FIG. 1 that a plurality of pumps 106 may be used, wherein the plurality of pumps 106 is locked to each other.

In one example, the nodes 104 may be in communication with the connection network 102 via a feedback loop. The feedback loop may include a respective connection 112-1 to 112-*n* for each one of the nodes 104-1 to 104-*n* to the connection network 102 and a respective connection 114-1 to 114-*n* for each one of the nodes 104-1 to 104-*n* from the connection network 102 to the nodes 104. In other words, the number of connections 112 and the number of connections 114 may be equal to the number of nodes 104 in the apparatus 100.

It should be noted that the apparatus 100 uses a plurality of different nodes 104. In other words, each node 104 is a separate physical device. Said another way, the apparatus 100 does not use a single node that sends a single signal that is passed through a series of different time delays in a multiplexer to the connection network 102.

The pump 106 may provide energy to each one of the plurality of nodes 104. The energy may be a light or optical energy (e.g., a laser). The energy provided by the pump 106 may activate the nodes 104. The amount of energy provided by the pump 106 may be an amount needed to activate the nodes 104.

In one example, when the nodes 104 are activated, each one of the nodes 104 may store a state or value. In some implementations, the state or value may be a binary set of values (e.g., store two different values). In some examples, the binary set of values may be +1 or −1. In another example, the binary set of values may be a zero (0) or a one (1). In another implementation, the value may be any continuous value between 0 and 1. In other implementations, the binary set of values may be a phase (e.g., 0 or π) or any continuous phase between 0 and 2 π for an oscillating energy signal.

Each value may be associated with a particular energy level for the particular Ising problem that is being solved. The apparatus 100 may continuously run such that the values are processed by the connection network until each node has a value that is associated with a minimum energy level. In one example, each one of the nodes 104 may have a readout 110-1 to 110-*n* to allow a user to read the values stored in each one of the plurality of nodes 104 when a solution is reached.

In one example, the connection network 102 may include a two dimensional array of elements 120-1 to 120-*n* (herein also referred to collectively as elements 120 or individually as an element 120). In some implementations, each group 122-1 to 122-*n* (herein also referred to collectively as groups 122 or individually as a group 122) of the two dimensional array of elements may be in communication with a respective one of the nodes 104-1 to 104-$n$. In other words, a value stored in node 104-1 may be sent to the group 122-1 via the connection 112-1 to be processed, a value stored in node 104-2 may be sent to the group 122-2 via the connection 112-2, and so forth. The processed values may then be transmitted from the group 122-1 to the node 104-1 via the connection 114-1, from the group 122-2 to the node 104-2 via the connection 114-2, and so forth.

In one example, processing of the values stored in the nodes 104 may include adjusting the value received from the nodes 104 when passing through a group 122 of elements 120 with the inputs 108 received by each element 120. As discussed in further detail below, the connection network 102 may be a matrix that performs a linear transformation of the outputs of the nodes 104 and send the linearly transformed outputs back to the nodes 104.

The two dimensional array of elements may be arranged in accordance with the Hamiltonian function, $$H = -\sum_{i<j} J_{ij}\vec{\sigma_i}\cdot\vec{\sigma_j}\ (1 \le i, j \le N),$$

where $J_{ij}$ are the elements of a coupling matrix (e.g., the elements 120 of the connection network 102) between spins $\sigma_i$ and $\sigma_j$ and N is the number of nodes 104, that is used to solve Ising problems. Different Ising problems may have different initial parameters that define the particular Ising problem. These parameters may be used to tune the connection network 102 via inputs 108-1 to 108-$m$. In one example, each element 120 may be capable of receiving an input 108.

In one example, the connection network 102 may be built and have values associated with each element 120 to solve a specific Ising problem and have a specific number of elements 120 that match the number of elements in the coupling matrix $J_{ij}$. In another example, the connection network 102 may be built and the elements 120 may be dynamically changed via the input values 108 to solve different Ising problems.

In one example, the apparatus 100 may be an adiabatic computer. In other words, when the pump 106 is turned on, energy is sent through the apparatus 100 to activate the nodes 104. The apparatus 100 may run continuously until the apparatus 100 reaches a steady state. The steady state may be reached when the values stored in the nodes are each associated with a minimum energy level.

In other words, when the apparatus 100 is initially turned on, the values stored in the nodes 104 may be fed into the connection network 102 and processed. The values may be changed and sent back to the respective nodes 104. This loop may repeat continuously until the values stored in the nodes 104 are no longer changing when processed through the connection network 102 and reach a steady state value that is associated with a minimum energy level. The values stored in the nodes 104 may be read via the readouts 110 and represent the solution to the particular Ising problem that is being solved by the connection network 102.

For example, types of Ising problems may include a traveling salesman problem, selecting a best route to a destination, and the like. For example, the connection network may represent all possible paths from a starting point to a destination on a map. Initial parameters associated with this particular Ising problem may be used to tune the connection network 102. The nodes 104 may be set with an initial value. The apparatus 100 may be turned on and allowed to run continuously until it reaches a steady state or a minimum energy state. The values stored in the nodes 104 at the steady state or the minimum energy state may represent a solution to the shortest path from the starting point to the destination on the map.

Figure 2:
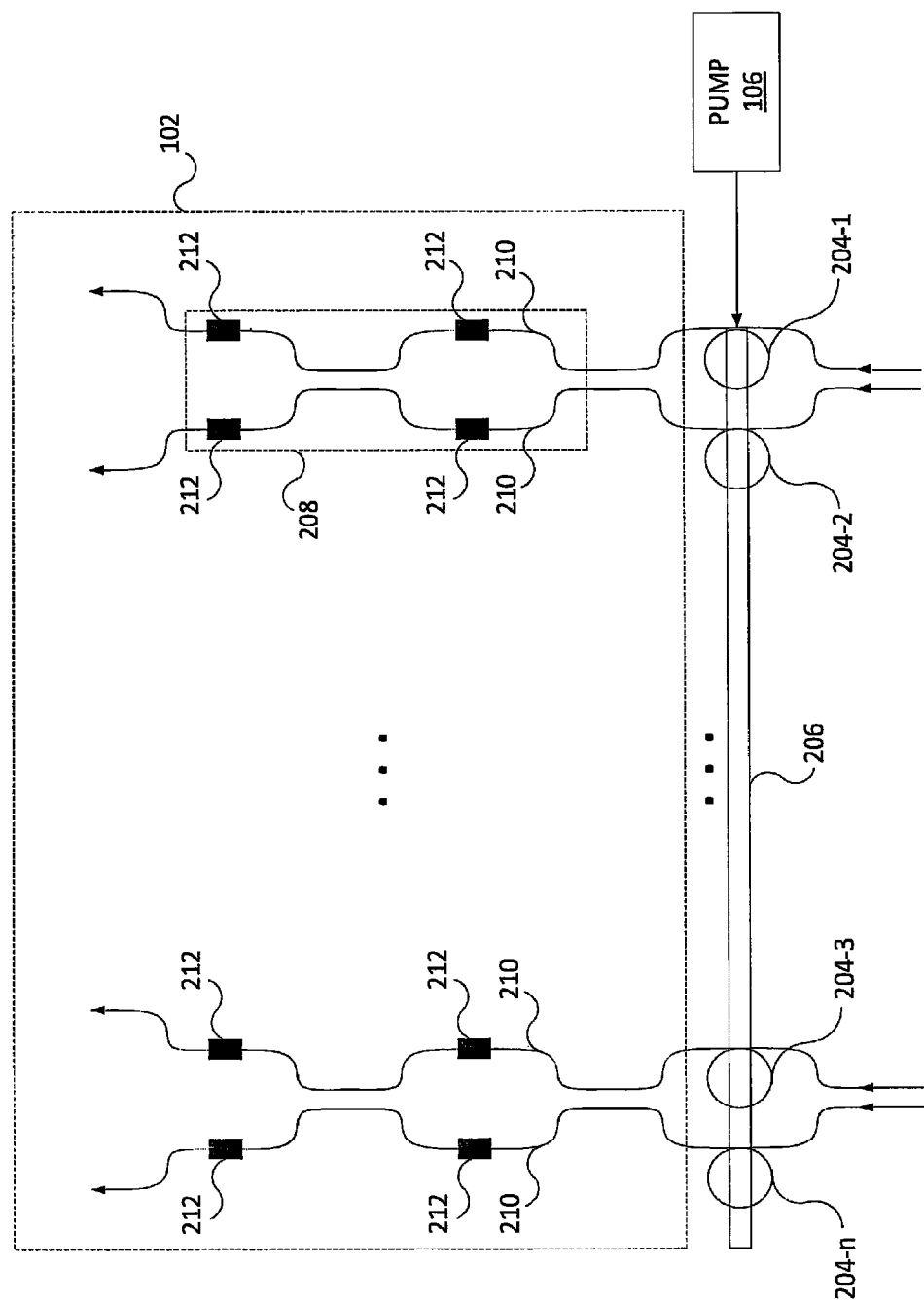
FIG. 2 is a diagram of an example implementation of the apparatus.

In one example, the apparatus 100 may also be an optical computer. In other words, an example implementation of the apparatus 100 may be illustrated in FIG. 2. Each node 104 may be an optical component that can store a state or value. For example, FIG. 2 illustrates a physical representation of the nodes 104 as ring resonator photonic nodes 204-1 to 204-$n$ (herein referred to collectively as ring resonator photonic nodes 204 or individually as a ring resonator photonic node 204). The ring resonator photonic nodes 204 may be coupled to the pump 106 via a pump waveguide 206.

In one implementation, the connection network 102 may be a network of Mach-Zehnder interferometers (MZI). For example, the elements 120 of the connection network 102 may be implemented by a series of waveguides 210 that perform a linear transformation on the values stored in the nodes 104. In one example, the waveguides may be grouped as 2 by 2 unitary building blocks 208 of phase shifters 212.

In one example, the phase shifters 212 may receive the inputs 108. In one example, the inputs 108 may be received by the phase shifter 212 as an electrical signal. For example, each phase shifter may receive one of the inputs 108. The values stored in the ring resonator photonic nodes 204 may be sent to each group of 2×2 unitary building blocks 208 for processing with the inputs 108 received by the phase shifters 212. The processed values may then be fed back to the ring resonator photonic nodes 204 and the process may repeat similar to the apparatus 100.

In one example, the feedback loop may be formed by connecting the waveguides back to the ring resonator photonic nodes 204. In another example, the feedback loop may be formed using a reflector, as discussed in further detail below in FIG. 3.

It should be noted that the above provides one example physical implementation of the nodes 104 and the connection network 102. Other optical components can be used to implement the photonic nodes in various in other configurations. Other types of optical components may include photonic crystal cavities, complexes of ring resonators or photonic crystal cavities, and the like.

Figure 3:
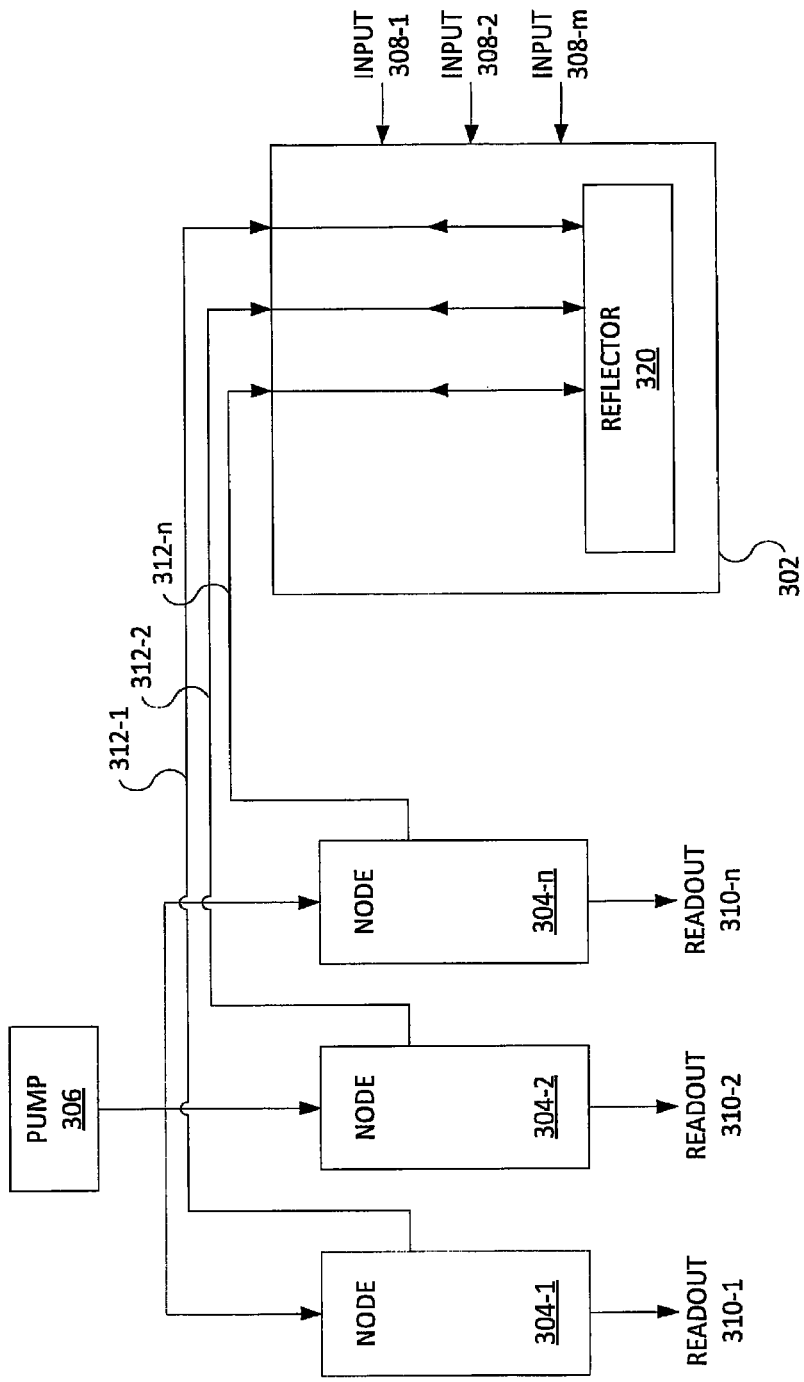
FIG. 3 is a block diagram of an example of the apparatus using a reflector.

FIG. 3 illustrates a block diagram of an example apparatus 300 that uses a reflector 320. In one example, the apparatus 300 may include a plurality of nodes 304-1 to 304-$n$ and a pump 306 similar to the apparatus 100 illustrated in FIG. 1. In addition, each one of the nodes 304-1 to 304-$n$ may provide a readout 310-1 to 310-$n$, respectively. The connection network 302 may include a two dimensional array of elements and be tuned to solve a particular Ising problem with inputs 308-1 to 308-$m$ similar to the connection network 102.

However, the apparatus 300 may connect the nodes 304-1 to 304-$n$ to a respective group of the two dimensional array of elements in the connection network 302 via two-way connections 312-1 to 312-$n$. In addition, the two-way connections 312-1 to 312-$n$ may terminate at a reflector 320. Thus, the feedback loop may be implemented using a single set of connections 312-1 to 312-$n$ to and from the connection network 302. The values are sent from the nodes 304-1 to 304-$n$ to the connection network 302 to be processed. The processed values are reflected by the reflector 320 and transmitted back to the respective nodes 304-1 to 304-$n$.

Figure 4:
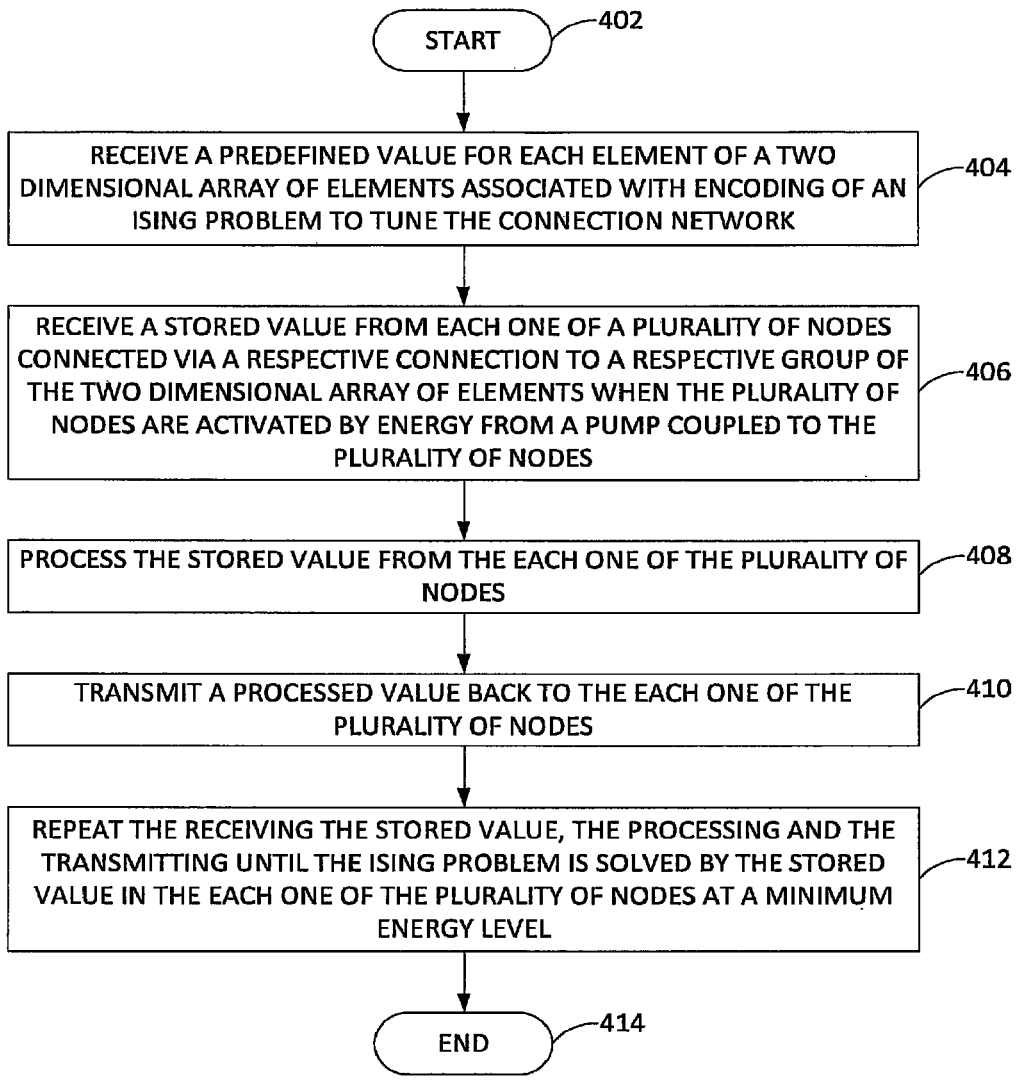
FIG. 4 is a flow diagram of an example method for solving an Ising problem.

FIG. 4 illustrates a flow diagram of an example method 400 for solving an Ising problem. In one example, the blocks of the method 400 may be performed by the apparatus 100 or 300. In one example, the method 400 may be performed by the connection network 102 or 302 of the apparatus 100 or 300, respectively.

At block 402, the method 400 begins. At block 404, the method 400 receives a predefined value for each element of a two dimensional array of elements associated with encoding of an Ising problem to tune the connection network. For example, the connection network may be tuned with inputs that are associated with a particular Ising problem that is being solved.

For example, the connection network may be programmed as a Hamiltonian function that can solve Ising problems. The coupling matrix $J_{ij}$ may be implemented as a two dimensional array of elements i, j. Thus, the inputs may represent the initial value or phase for each element i, j of the Hamiltonian function. In another example, a combiner may be used to reduce the number of physical elements in the connection network, while maintaining the $J_{ij}$ coupling matrix.

At block 406, the method 400 receives a stored value from each one of a plurality of nodes connected via a respective connection to a respective group of the two dimensional array of elements when the plurality of nodes are activated by energy from a pump coupled to the plurality of nodes. When the apparatus is turned on, the pump may provide energy that activates the nodes that have stored an initial value. In one example, the energy may be a coherent light. The stored values may be sent to each respective group of the connection network to be processed.

At block 408, the method 400 processes the stored value from the each one of the plurality of nodes. In one example, processing of the values stored in the nodes may include adjusting the value received from the nodes when passing through a group of elements with the inputs received by each element. In one example, the processing may include a linear transformation of the stored value from each one of the plurality of nodes. The processed value is outputted by each group of elements to be fed back to the respective node.

At block 410, the method 400 transmits a processed value back to the each one of the plurality of nodes. For example, each group of the connection network may output the processed values and transmit the processed value back to a respective node. Based on the processed value, the nodes may change the value that is stored.

At block 412, the method 400 repeats the receiving the stored value, the processing, and the transmitting until the Ising problem is solved by the stored value in the each one of the plurality of nodes at a minimum energy level. For example, each value in each node may be associated with an energy level. The blocks 406-410 may be repeated until the value of each node is associated with the minimum energy level.

For example, as discussed above, the apparatus 100 and 300 may be an adiabatic computer that non-deterministically solves the Ising problem. In other words, when the pump is turned on and energy is sent through the apparatus 100 or 300, the apparatus 100 or 300 may run continuously until the apparatus 100 or 300 reaches a steady state. The steady state may be reached when the amount of energy associated with each value stored in each node is at a minimum.

In other words, when the apparatus 100 or 300 is initially turned on, the values stored in the nodes may be fed into the connection network and processed. The processed values may be sent back to the respective nodes and the respective nodes may change the value that is stored in the respective nodes based on the processed values. This loop may repeat continuously until the values stored in the nodes are no longer changing when processed through the connection network. The values stored in the nodes may be read via the readouts and represent the solution to the particular Ising problem that is being solved by the connection network.

For example, types of Ising problems may include a traveling salesman problem, selecting a best route to a destination, and the like. For example, the connection network may represent all possible paths from a starting point to a destination on a map. Initial parameters associated with this particular Ising problem may be used to tune the connection network. The nodes may be set with an initial value. The apparatus 100 or 300 may be turned on and allowed to run continuously until it reaches a steady state or a minimum energy state. The values stored in the nodes at the steady state may represent the minimum energy state and be values that may represent a solution to the shortest path from the starting point to the destination on the map. At block 414, the method 400 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
    nodes, each one of the nodes storing a value;
    a pump coupled to the nodes, the pump providing energy to the each one of the nodes; and
    a connection network comprising a two dimensional array of elements, wherein each group of the two dimensional array of elements is in communication with a respective one of the nodes, wherein:
        the connection network is tuned with parameters associated with encoding of an Ising problem,
        the connection network processes the value stored in the each one of the nodes, and
        the Ising problem is solved by the value stored in the each one of the nodes attaining a steady state at a minimum energy level of the nodes and the connection network.

2. The apparatus of claim 1, wherein the nodes each comprise an optical component that is storing a state.

3. The apparatus of claim 1, wherein the value comprises a binary set of values.

4. The apparatus of claim 1, wherein the pump comprises a coherent light pump.

5. The apparatus of claim 1, wherein each one of the nodes provides a readout.

6. The apparatus of claim 1, further comprising:
    a reflector coupled to the connection network, wherein an output of the each group of the two dimensional array of elements is reflected by the reflector and propagated back to the respective one of the nodes.

7. The apparatus of claim 1, wherein the nodes is connected to the connection network via a number of connections equal to a number of the nodes and the connection network is connected back to the nodes via the number of connections equal to the number of the nodes to form a feedback loop.

8. A method, comprising:
receiving, by a connection network, a predefined value of each element of a two dimensional array of elements associated with encoding of an Ising problem to tune the connection network;
receiving, by the connection network, a stored value from each one of nodes connected via a respective connection to a respective group of the two dimensional array of elements when the nodes are activated by energy from a pump coupled to the nodes;
processing, by the connection network, the stored value from the each one of the nodes;
transmitting, by the connection network, a processed value back to the each one of the nodes; and
repeating, by the connection network, the receiving the stored value, the processing, and the transmitting until the Ising problem is solved by the stored value in the each one of the nodes attaining a steady state at a minimum energy level of the nodes and the connection network.

9. The method of claim 8, wherein the nodes each comprises an optical component storing a state.

10. The method of claim 8, wherein the value comprises a binary set of values.

11. The method of claim 8, wherein the energy from the pump comprises a coherent light.

12. The method of claim 8, wherein the transmitting comprises reflecting the processed value back to the each one of the nodes.

13. The method of method of claim 8, wherein the transmitting comprises transmitting the processed value back to the each one of the nodes via a feedback loop comprising a respective connection from each group of the two dimensional array of elements to a respective node of the nodes.

14. An apparatus, comprising:
ring resonator photonic nodes, wherein each one of the ring resonator photonic nodes stores a value;
a pump coupled to each one of the ring resonator photonic nodes via a pump waveguide, the pump providing energy to each one of the ring resonator photonic nodes; and
a connection network comprising a two by two building block of elements, wherein:
each element of the two by two building block comprises phase shifters that tune the connection network with parameters associated with encoding of an Ising problem,
the connection network processes the value stored in the each one of the ring resonator photonic nodes,
and the Ising problem is solved by the value stored in the each one of the ring resonator photonic nodes attaining a steady state at a minimum energy level of the ring resonator photonic nodes and the connection network.

15. The apparatus of claim 14, wherein each one of the phase shifters receives an electrical signal that is processed in order to set one parameter of the parameters associated with the Ising problem.

16. The apparatus of claim 1, wherein the connection network represents possible paths from a starting point to a destination on a map.

17. The apparatus of claim 15, wherein the values stored in the nodes at the steady state represent a solution of a shortest path from the starting point to the destination.

* * * * *